(12) United States Patent
Sawada et al.

(10) Patent No.: US 8,053,996 B2
(45) Date of Patent: Nov. 8, 2011

(54) LIGHT EMITTING DEVICE FOR TRANSMISSION OF COMMUNICATIONS INFORMATION

(75) Inventors: Akira Sawada, Minato-ku (JP); Tetsuya Hara, Minato-ku (JP); Motohiko Okabe, Minato-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 541 days.

(21) Appl. No.: 12/280,750

(22) PCT Filed: Feb. 27, 2007

(86) PCT No.: PCT/JP2007/053641
§ 371 (c)(1),
(2), (4) Date: Oct. 21, 2008

(87) PCT Pub. No.: WO2007/097459
PCT Pub. Date: Aug. 30, 2007

(65) Prior Publication Data
US 2009/0167191 A1 Jul. 2, 2009

(30) Foreign Application Priority Data
Feb. 27, 2006 (JP) .................... 2006-050925

(51) Int. Cl.
*H05B 41/30* (2006.01)
(52) U.S. Cl. .............. 315/200 A; 315/136; 315/291; 315/360
(58) Field of Classification Search .............. None
See application file for complete search history.

(56) References Cited

U.S. PATENT DOCUMENTS

| 4,504,130 | A | | 3/1985 | Bell et al. | |
| 5,059,975 | A | * | 10/1991 | Nakatsuka | ............... 341/26 |
| 2003/0030386 | A1 | | 2/2003 | Leeb et al. | |
| 2003/0031015 | A1 | | 2/2003 | Ishibashi | |
| 2004/0051474 | A1 | * | 3/2004 | Wong | ............... 315/291 |
| 2004/0071471 | A1 | | 4/2004 | Baker et al. | |

FOREIGN PATENT DOCUMENTS

| CN | 2030739 U | 1/1989 |
| DE | 10 2006 008 040 A1 | 8/2007 |
| EP | 1 684 001 A1 | 7/2006 |
| JP | 11-3473 | 1/1999 |
| JP | 11 213714 | 8/1999 |
| JP | 2002 202741 | 7/2002 |
| JP | 2004 185359 | 7/2004 |

(Continued)

OTHER PUBLICATIONS

Office Action issued Jul. 27, 2011, in German Patent Application No. 11 2007 000 466.5 (with English-language translation).

(Continued)

*Primary Examiner* — Shawki S Ismail
*Assistant Examiner* — Jany Tran
(74) *Attorney, Agent, or Firm* — Oblon, Spivak, McClelland, Maier & Neustadt, L.L.P.

(57) ABSTRACT

A light emitting device 1 is adapted, with a distributed power supply voltage, to turn on a light emitter 7, while timing a continuous conduction time with a pulse generating circuit 2, a frequency dividing circuit 3, and a counting memory circuit 4, to flash the light emitter 7 on and off with an on-off pattern depending on a result of the timing, signaling out information on the continuous conduction time.

5 Claims, 6 Drawing Sheets

FOREIGN PATENT DOCUMENTS

| | | |
|---|---|---|
| JP | 2004-272797 A | 9/2004 |
| JP | 2005 57476 | 3/2005 |
| JP | 2005-216780 | 8/2005 |
| TW | 222828 | 4/1994 |
| WO | WO 2004/109956 A1 | 12/2004 |

OTHER PUBLICATIONS

Office Action issued Jun. 21, 2011, in Japanese Patent Application No. 2006-050925 (with English-language translation).

* cited by examiner

LIGHT EMITTING DEVICE FOR TRANSMISSION OF COMMUNICATIONS INFORMATION

TECHNICAL FIELD

The present invention relates to a light emitting device.

BACKGROUND ART

In recent years, light emitting devices such as a red LED have a widely enhanced luminance, with an increased frequency of use, as a light source for traffic sign indicators, signals, indication displays, or the like.

Moreover, in recent years, there have been proposals to provide such light emitting devices with another function than indication, such as a function for communications, for a multi-functionality to be implemented.

For instance, in Japanese Patent Application Laid-Open Publication No. 2002-202741, there is a disclosure of techniques for a light emitting device in use as a traffic sign indicator to be flashed on and off to transmit information, such as phonetic information, to running vehicles. Further, in Japanese Patent Application Laid-Open Publication No. 2004-185359, there is a disclosure of techniques for a light emitting device in use as illumination to be flashed on and off to transmit phonetic information, such as a guiding message.

DISCLOSURE OF INVENTION

For such transmission of information by communications using a light emitting device, many electronics are needed, such as an information holder for holding communication information such as an indication data and a communication data, a receiver for receiving communication information stored in the information holder, and a lighting controller for a lighting control of the light emitting device in accordance with communication information received by the receiver.

In particular, for combination of an information holder that holds communication information as a transmission object and a light emitting device that indicates communication information, as they are at a physically separated distance from each other, there are many points to be considered, such as, among others, installation of a drive circuit and a transmission line, delay by transmission route, and attenuation of power.

Further, for warning lights to be lit upon alarm occurrences as well as indication lights for indication of equipment status, not simply "whether a warning light or an indication light is on or not" is very important information, but also "how long it has been on" is important information.

However, in such techniques as described, it was typical to provide no indication of an elapsed time after lighting. It therefore was needed to provide a function for storing an elapsed time to an information holder, a receiver or the like, with the more increase in scale of an entirety of the device. Specifically, for lack of a sufficient space for installation of a receiver at the indication device end, with a failure to provide a storing function to the receiver, the indication of elapsed time was disabled as a frequent issue.

The present invention has been devised in view of the foregoing, and it is its objective to provide a light emitting device that enables indication of a lighting time of, among others, a warning light, an indication light or the like, without provision of a receiver, a lighting controller or such in a vicinity of the warning light, the indication light or the like.

According to a main aspect of the present invention, a light emitting device to be provided comprises a light emitter for light emission by an application of a drive voltage to inject an optical signal, a memory circuit with stored information, and a switching circuit for a switching of a power supply voltage to generate the drive voltage with an on-off pattern corresponding to information in the memory circuit, for the application to the light emitter to have said information injected as the optical signal.

BRIEF DESCRIPTION OF DRAWINGS

[FIG. 1]
[FIG. 5]
[FIG. 6]
[FIG. 7]

BEST MODE FOR CARRYING OUT THE INVENTION

Figure 1:
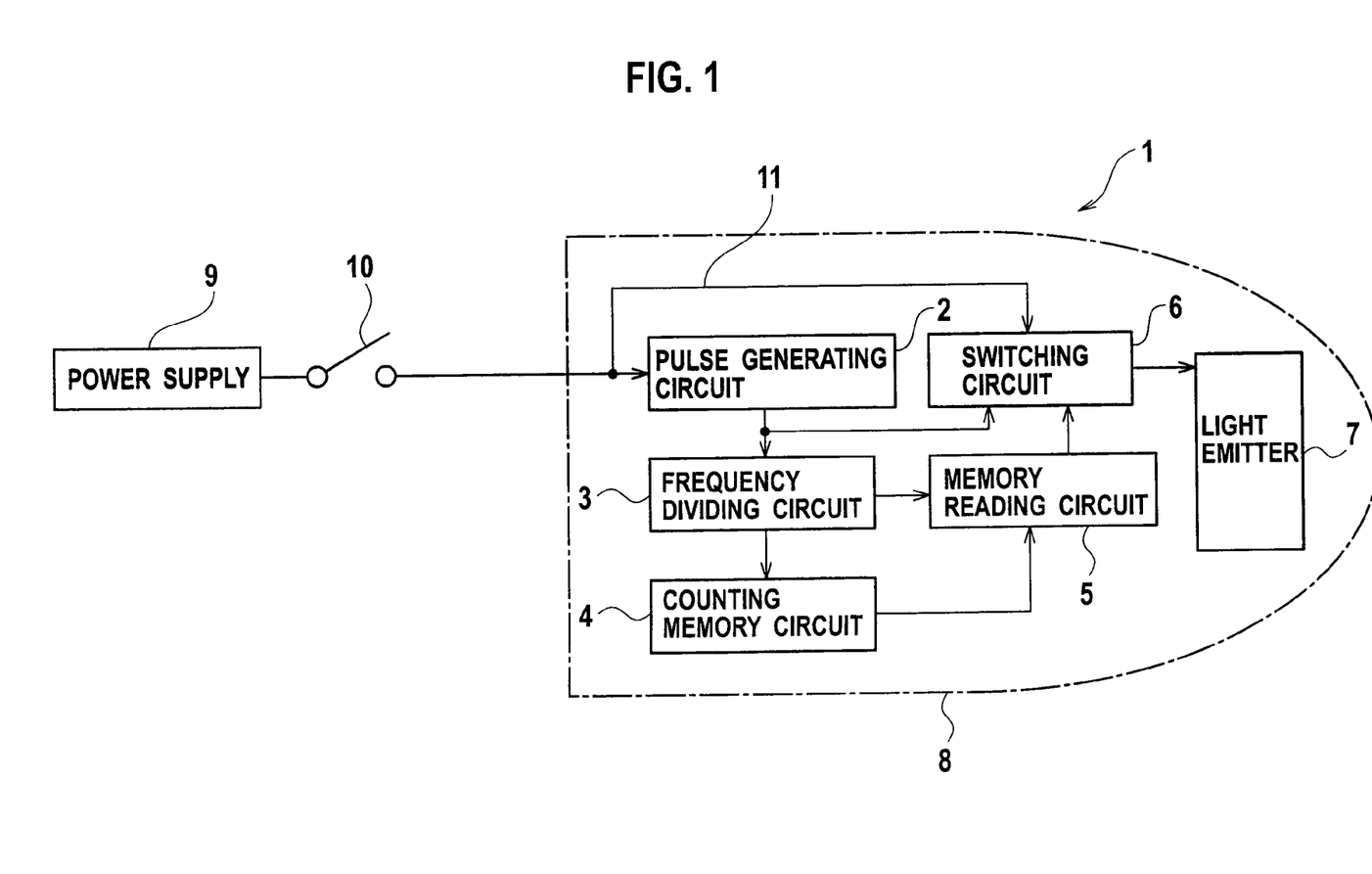
FIG. 1 is a block diagram showing a light emitting device according to an embodiment of the present invention.

FIG. 1 is a block diagram showing a light emitting device according to an embodiment of the present invention.

As shown in the figure, the light emitting device 1 includes a pulse generating circuit 2, a frequency dividing circuit 3, a counting memory circuit 4, a memory reading circuit 5, a switching circuit 6, a light emitter 7, and a case 8 for a molding integration of them. The light emitting device 1 is connected to a combination of a power supply 9 and a power supply switch 10. With the power supply switch 10 turned on to supply a power supply voltage output from the power supply 9 to the light emitting device 1, the light emitting device 1 is adapted to time a continuous conduction time, and have the light emitter 1 flash with an on-off pattern depending on a result of the timing, signaling out information on the continuous conduction time.

The pulse generating circuit 2 has, among others, an oscillation device such as a quartz crystal oscillator. With the power supply switch 10 on, as the power supply voltage output from the power supply 9 is distributed to a power supply line 11, the pulse generating circuit 2 makes the oscillation device oscillate to generate a pulse signal with preset characteristics, e.g. with a pulse interval "1 ms" and a duty ratio "1:1", for supply to the frequency dividing circuit 3 and the switching circuit 6.

Figure 2:
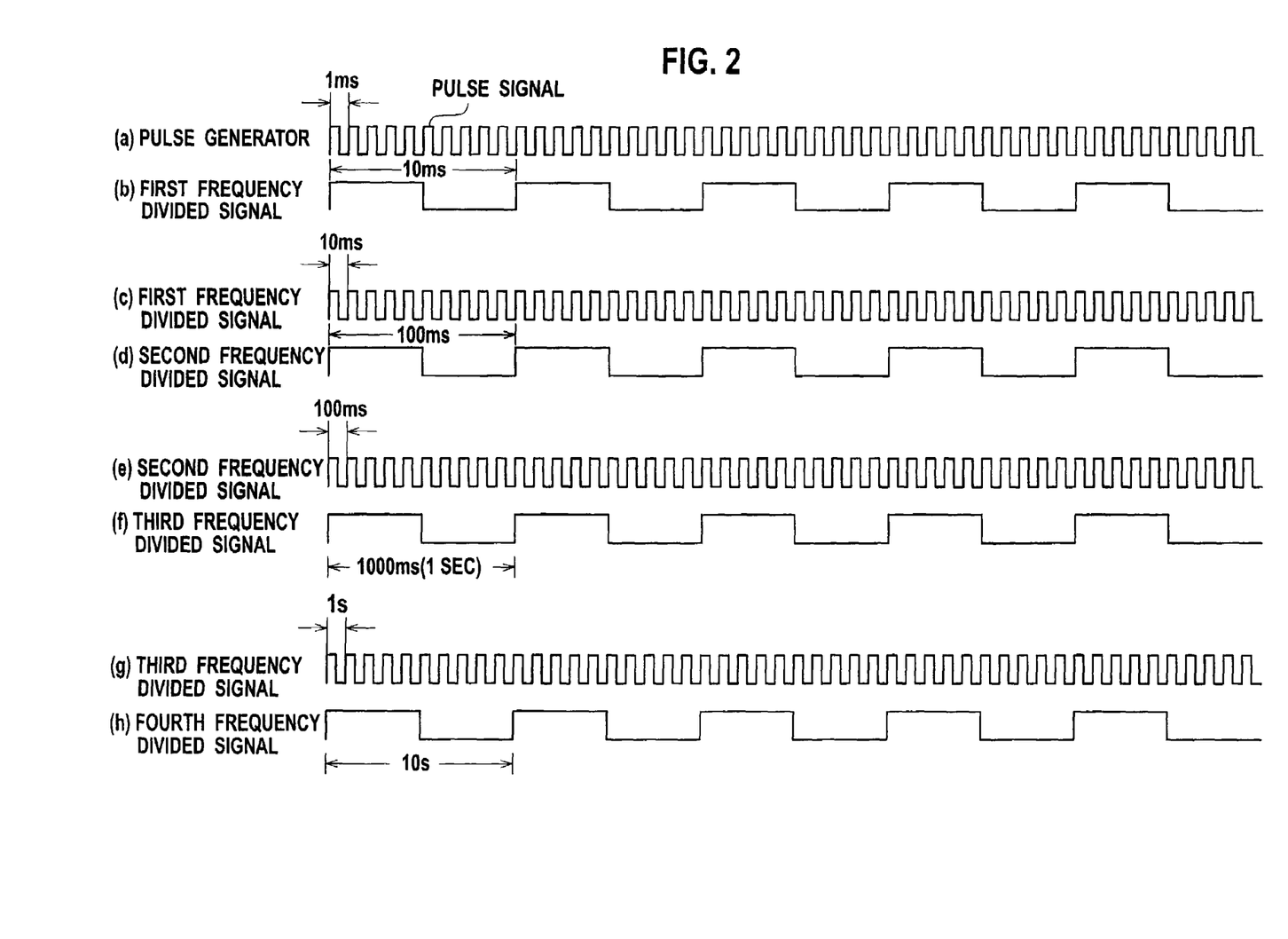
[FIG. 2] Given in FIG. 2 are waveform diagrams illustrating examples of first to fourth frequency divided signals to be generated at a frequency dividing circuit shown in FIG. 1.

The frequency dividing circuit 3 has a set of multi-staged frequency dividers (e.g. toggle flip-flops). As illustrated at (a) to (h) in FIG. 2, the set of frequency dividers is adapted for steps of frequency dividing a pulse signal, which has a pulse interval of "1 ms" ((a) of FIG. 2) when output from the pulse generating circuit 2, to generate a first frequency divided signal that has a pulse interval of "10 ms" ((b) and (c) of FIG. 2), a second frequency divided signal that has a pulse interval of "100 ms" ((d) and (e) of FIG. 2), a third frequency divided signal that has a pulse interval of "1000 ms (or 1 s)" ((f) and (g) of FIG. 2), and a fourth frequency divided signal that has a pulse interval of "10 s" ((h) of FIG. 2). Then, the third frequency divided signal is supplied to the memory reading circuit 5, and the fourth frequency divided signal is supplied to the counting memory circuit 4.

The counting memory circuit 4 has a multiplicity of counter elements (e.g. binary registers). With the power supply voltage distributed to the power supply line 11 with the power supply switch 10 on, the counting memory circuit 4 is adapted to reset the counter elements, setting back the count value to a "0", and thereafter, to take in a fourth frequency divided signal output from the frequency dividing circuit 3, to have an incremented count value. In this situation, as the fourth frequency divided signal has the pulse interval "10 s", the count value times ten gives the value of an elapsed time (continuous conduction time) after the power supply switch 10 was turned on.

The memory reading circuit 5 has, among others, a number of gate elements corresponding to the number of bits of lapse time that the counting memory circuit 4 generates. The memory reading circuit 5 is adapted, each time when given a third frequency divided signal output from the frequency dividing circuit 3, to read out of the counting memory circuit 4 a count value in the form of an array of bits of "0" and "1" (parallel bit array), for supply to the switching circuit 6.

The switching circuit 6 includes a set of switching elements, a parallel-serial converter, etc. When the power supply voltage is distributed to the power supply line 11 with the power supply switch 10 turned on, the switching circuit 6 starts supplying power to the light emitter 7. After that, as illustrated at (a) to (c) in FIG. 3, the switching circuit 6 is adapted, each time when given a count value output from the memory reading circuit 5 in synchronism with a third frequency divided signal ((c) of FIG. 3), to take it in, and parallel-serially convert. Then, the switching circuit 6 operates to add start bits ("00" in binary notation) to the head of a bit string obtained by that conversion, and add stop bits ("00" in binary notation) to the tail end of the bit string. Further, the switching circuit 6 operates, in synchronism with the pulse signal ((a) of FIG. 3) output from the pulse generating circuit 2, to generate a power supply voltage sequence (as a drive voltage sequence) ((b) of FIG. 3) corresponding to the bit string (as an on-off pattern), for supply to the light emitter 7.

Figure 3:
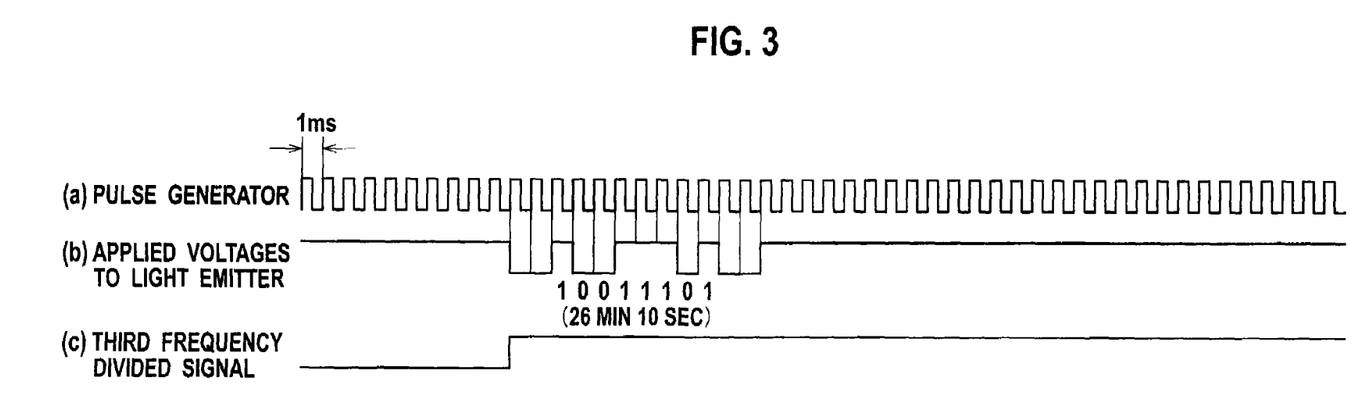
[FIG. 3] Given in FIG. 3 are waveform diagrams illustrating exemplary actions of a switching circuit shown in FIG. 1.

In this respect, the counting memory circuit 4 is preset for an increment of "1" to each "10-second interval", and as illustrated at (a) to (c) in FIG. 3, if the count read from the counting memory circuit 4 has a value (count value) of "10011101" in binary notation, i.e., "157" in decimal notation, it represents an elapse of "1,570 seconds (26 minutes 10 seconds)" after the power supply voltage was distributed to the power supply line 11 with the power supply switch 10 turned on.

Figure 4:
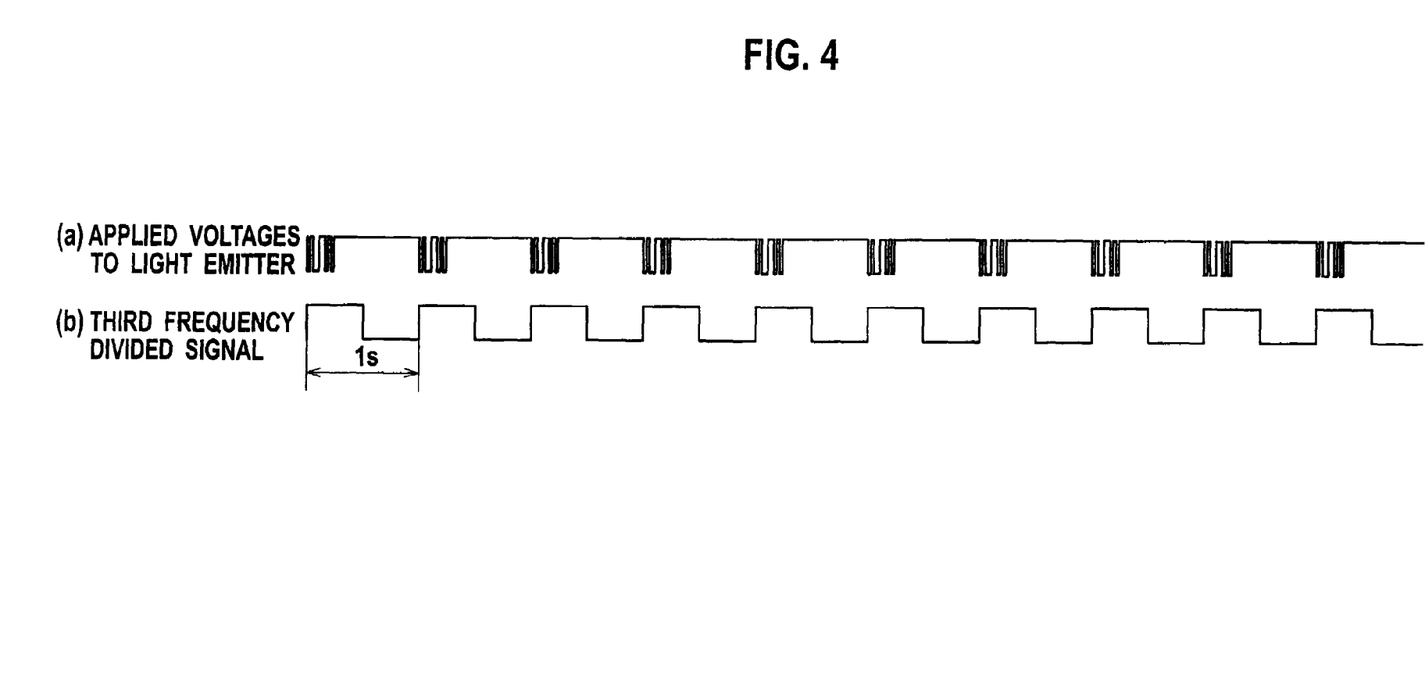
[FIG. 4] Given in FIG. 4 are waveform diagrams illustrating exemplary light emitting actions of a light emitter shown in FIG. 1.

The light emitter 7 has a device for emission of light, such as a visible light LED. As illustrated at (a) and (b) in FIG. 4, given a sequence of power supply voltages ((a) of FIG. 4) supplied from the switching circuit 6, the light emitter 7 is adapted for emission of light to generate a visible light signal with information on an elapsed time (information of continuous conduction time), for projection to the outside.

In this respect, assuming as an oscillation frequency of the pulse generating circuit 2 to be "1,000 Hz", the content of indication is updated at intervals of 1 second, with the power supply voltage turning on and off by a period of one 1,000-th second. Therefore, the visible light signal projected from the light emitter 7 has a data transfer rate of "1,000 bits/sec" in asynchronous communication.

If the count read from the counting memory circuit 4 has a value (count value) of "10011101" in binary notation, i.e., "157" in decimal notation as illustrated at (b) in FIG. 3, it thus so follows that the light emitter 7 has a total light-out time of "seven 1,000-th seconds" in one second. Therefore, recognition of a continuous lighting is given to the human eye, allowing for a count value of the counting memory circuit 4 to be transferred to external equipment (e.g., a mobile telephone with a camera function or the like) without crippling an indication function or an illumination function of the light emitter 7.

The light emitting device 1 does not need a particularly specified format or protocol for communication of light emission information, and is employable for both synchronous communication and asynchronous communication. The light emitting device 1 affords the use of any communication system without problems, subject to a match between the system of communication for the switching circuit 6 to control the light emitter 7 to flash, and a reading and interpreting system of a mobile telephone with a camera function or the like.

Figure 5:
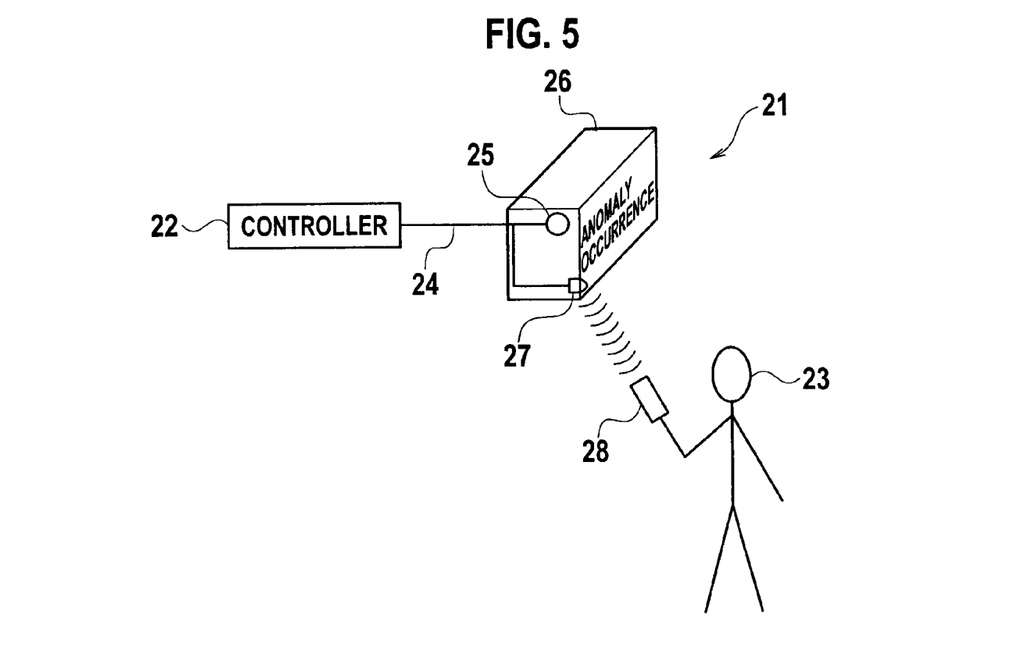
FIG. 5 is a schematic view of configuration of an exemplary indication system configured for notification of anomaly occurrence, using a light emitting device according to the present invention.

FIG. 5 is a schematic view of configuration of an exemplary indication system configured for notification of anomaly occurrence, using a light emitting device configured like the light emitting device 1 described.

As shown in the figure, the indication system 21 includes a controller 22 adapted to output a power supply voltage upon detection of an anomaly, an emergency light 26 installed in a place such as a passage for a public 23, a visible light source 25 disposed in the emergency light 26 and adapted, with the power supply voltage supplied through a power supply line 24, to light up for a back-lighting of a message "anomaly occurrence" put on an indication face of the emergency light 26, and a light emitting device 27 configured like the light emitting device 1 described, disposed on the indication face of the emergency light 26 or such, and adapted, with the power supply voltage supplied through the power supply line 24, to time an elapsed time after the power supply voltage was supplied, while injecting an infrared signal with information on the elapsed time.

It operates, when a certain anomaly is detected by the controller 22 and a power supply voltage is output, for distribution of the power supply voltage, via the route of controller 22→ power supply line 24→ visible light source 25 and light emitting device 27, to the visible light source 25 installed in the emergency light 26, to light up this for the back-lighting of the message "anomaly occurrence" provided in a form on the indication face of the emergency light 26. It is thus adapted to inform the anomaly occurrence to a public 23, while operating the light emitting device 27 to start a tiring, and inject an infrared signal indicating an elapsed time after an occurrence of the anomaly.

In this situation, the public 23 is allowed to employ an infrared communication function of an own mobile terminal (e.g. such a mobile terminal as representative by a mobile telephone with an infrared communication function or the like) 28, to read information signalized out of the light emitting device 27, and check an elapsed time after a lighting of the emergency light 26, at the very place where the emergency light 26 is installed.

Figure 6:
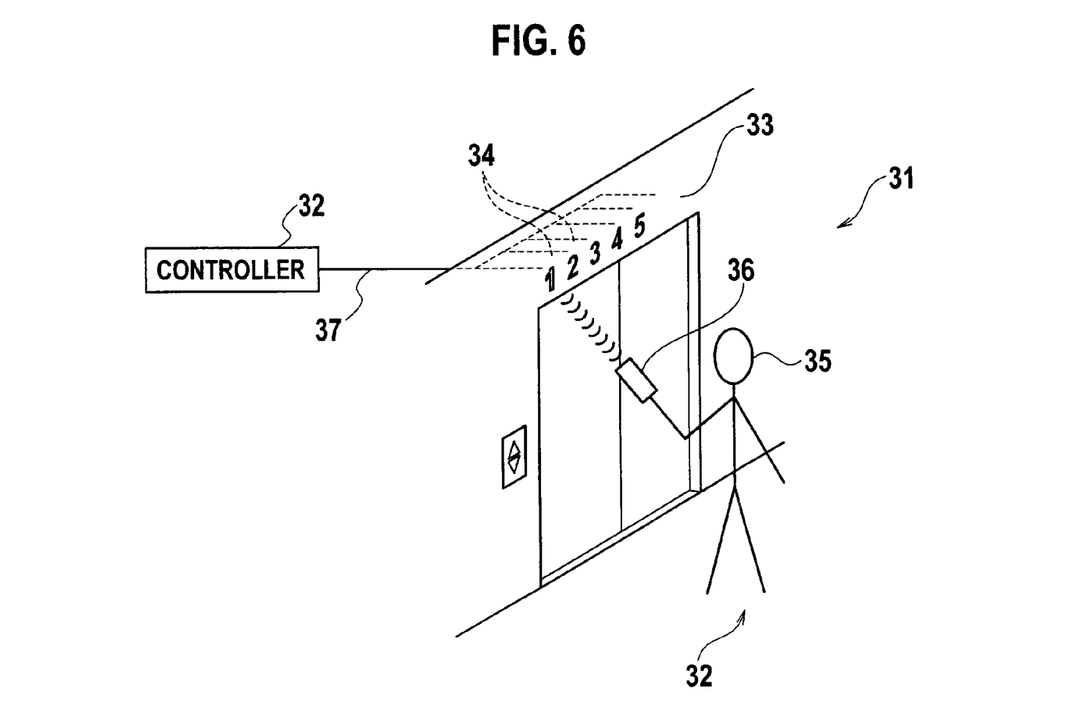
FIG. 6 is a schematic view of configuration of an exemplary floor indication system configured for indication of car location of an elevator, using light emitting devices according to the present invention.

FIG. 6 is a schematic view of configuration of an exemplary floor indication system configured for indication of car location of an elevator, light emitting devices configured like the light emitting device 1 described.

As shown in the figure, the floor indication system 31 includes a floor indicator 33 provided for an elevator hall 32, a set of light emitting devices 34 configured like the light emitting device 1 described and arranged in the floor indicator 33, and a terminal 36 for visible light communication to be carried by maintenance personnel 35 of the elevator, and has a controller 32 configured to control a car of the elevator and adapted, when outputting location information of the car, to supply a power supply voltage through a power supply line 37 to, out of the set of light emitting devices 34 arranged in the floor indicator 33, a light emitting device 34 designated by the car location information, e.g., a light emitting device 34 corresponding to a first floor, to light up this for a back-lighting of a floor indicating letter "1" in the floor indicator 33.

Along with such actions, the light emitting device 34 corresponding to the first floor starts a timing, and a visible light signal is projected from the light emitting device 34, turning on and off at high speeds, signaling information on an elapsed time after a stop of the car at the current floor.

It therefore is possible for maintenance personnel 35 to check the elapsed time after a stop of elevator at the first floor by no more than reading a light-up time indicated on the communication terminal 36, and even for a stop of elevator at fault, to grasp a stop time of elevator by trouble or such, without going all the way to a place where the elevator's controller is installed, thus allowing for a saved maintenance labor. Further, one can know a working of elevator in such an hour of day that it normally should have been out of service, thus allowing for determination of a time zone of unnatural operation, crime, etc.

Such being the case, the present embodiment is configured to turn on a light emitter 7 with a distributed power supply voltage, while using a combination of pulse generating circuit 2, frequency dividing circuit 3, and counting memory circuit 4 to time a continuous conduction time, flashing the light emitter 7 on and off in accordance with a result of the timing, thereby signaling out information on the continuous conduction time, which allows a simplified circuit to time a lighting time, with a reduced size in entirety of the device, enabling indication of a lighting time of, among others, a warning light, an indication light or the like, without provision of a receiver, a lighting controller or such in a vicinity of the warning light, the indication light or the like. The entire indication system can thus be simplified in configuration, achieving a significant cost down.

The embodiment is adapted to set a total light-out time of a visible light signal projected from the light emitter 7, within a range of "0 seconds" to "0.5 seconds", allowing for use of the light emitting device 1 as an illuminating light source, as well, without crippling the function as an illumination.

The embodiment is implemented with a switching circuit 6 operative to add power supply voltage pulses of start bits "00" to the head of a power supply voltage sequence representing a timing result, and add power supply voltage pulses of stop bits "00" to the tail end of the power supply voltage sequence, for supply to the light emitter 7 to light up this, which allows for a facilitated synchronization with external equipment, enabling indication of a lighting time of, among others, a warning light, an indication light or the like, without provision of a receiver, a lighting controller or such in a vicinity of the warning light, the indication light or the like. The entire indication system with the external equipment inclusive can thus be simplified in configuration, achieving a significant cost down.

In the embodiment, the light emitter 7 can be configured with any type of LED, such as a visible light LED, an infrared light LED, or an ultraviolet light LED, allowing any one of visible light, infrared light, and ultraviolet light to convey a lighting time of, among others, a warning light, an indication light or the like to external equipment, for indication thereon.

OTHER EMBODIMENTS

Figure 7:
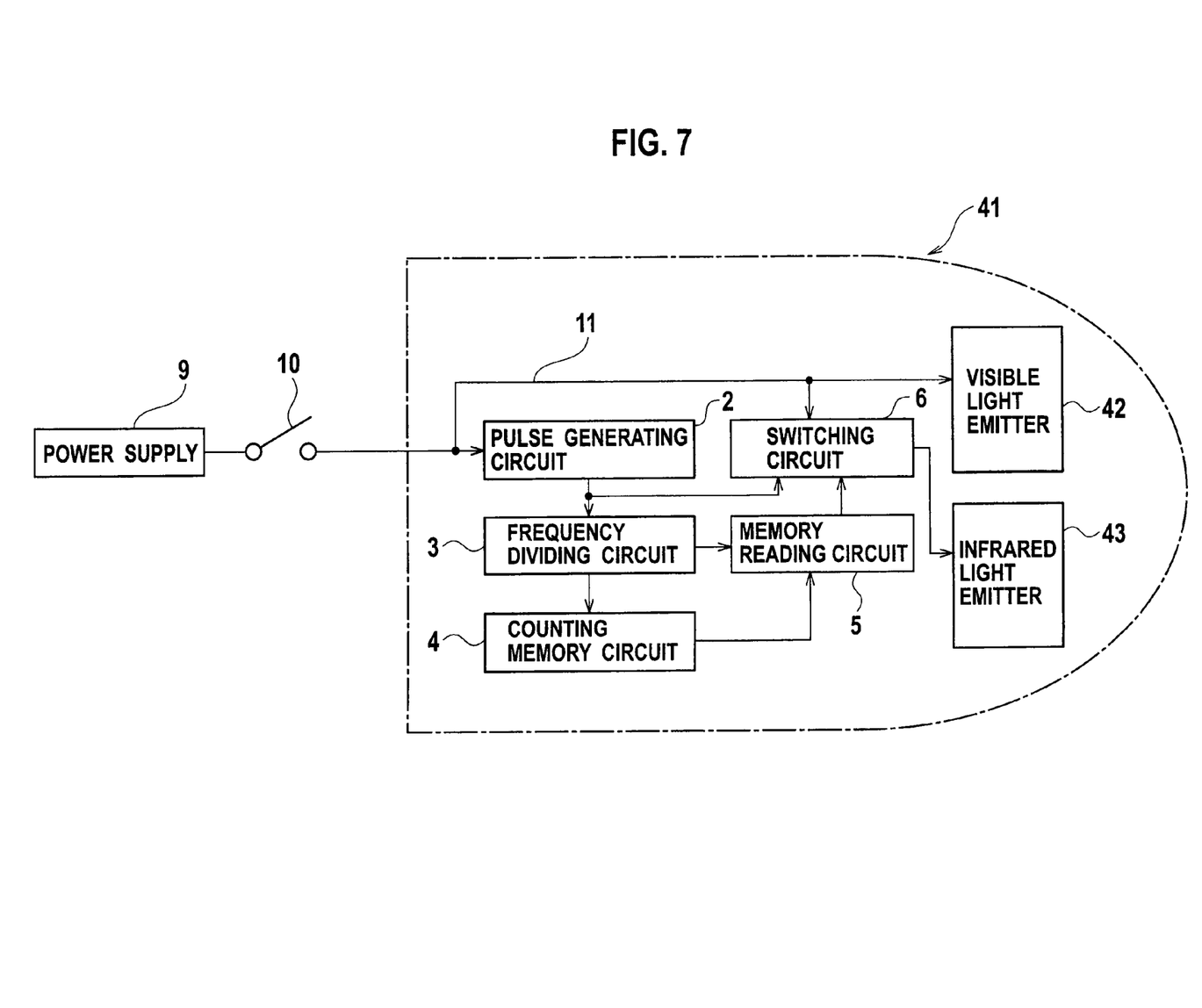
FIG. 7 is a block diagram showing a light emitting device according to another embodiment of the present invention.

FIG. 7 is a block diagram showing a light emitting device according to another embodiment of the present invention. With respect to FIG. 1, like components are designated by like reference characters to eliminate redundancy.

As shown in the figure, the light emitting device 41 includes a visible light emitter 42 composed of a visible light LED or the like, and an infrared light emitter 43 adapted to input from a switching circuit 6 information on a time of a power supply application to the visible light emitter 42, for infrared light emission with information on the time.

Such configuration allows the infra light emitter 43 to output no more than information on time, enabling communications with a mobile telephone with an infrared communication function as described.

In the foregoing embodiments, a count value (time information) of a counting memory circuit 4 is emitted as light However, the counting memory circuit 4 shown in FIG. 1 or FIG. 7 may have a variety of information stored therein, or may be substituted by a memory circuit with a variety of information stored therein, for an operation when lighting to periodically output a variety of information in memory from a light emitter 4 or an infrared light emitter 43. For this, the information may be various: positional information, audio assist information, character information, sensor information such as temperature information, or such.

INDUSTRIAL APPLICABILITY

According to the present invention, a light emitting device such as, among others, a warning light, an indication light, or the like can output various information in synchronism with the emission of light, allowing for an entire indication system simplified in configuration, achieving a significant cost down.

Moreover, it enables indication of a lighting time of; among others, a warning light, an indication light or the like, without provision of a receiver, a lighting controller or such in a vicinity of the warning light, the indication light or the like, and without crippling the function as an illumination, whereby the entire indication system can be simplified in configuration, achieving a significant cost down.

Still more, it allows a simplified circuit to time a lighting time, with a reduced size in entirety of the device, enabling indication of a lighting time of, among others, a warning light, an indication light or the like, without provision of a receiver, a lighting controller or such in a vicinity of the warning light, the indication light or the like, and without crippling the function as an illumination, whereby the entire indication system can be simplified in configuration, achieving a significant cost down.

The invention claimed is:

1. A light emitting device comprising:
    an oscillation circuit for generating a pulse signal with a predetermined cycle by an application of a power supply voltage;
    a frequency dividing circuit for dividing the pulse signal generated by the oscillation circuit to generate a plurality of divided signals;
    a counting circuit for counting a first divided signal of the plurality of divided signals to determine a count value as information representing a time during the application of the power supply;

a memory circuit for storing the count value determined by the counting circuit with the predetermined cycle;

a switching circuit for reading out the count value from the memory circuit, and for generating a signal pattern synchronized with a second divided signal of the plurality of divided signals generated by the frequency dividing circuit based on the count value read out, to switch the power supply voltage based on the signal pattern generated; and a light emitter for emitting a light signal with the signal pattern generated by the switching circuit, wherein the light signal encodes the information representing the time during the application of the power supply.

2. The light emitting device according to claim 1, wherein the light emitter emits one of visible light, infrared light, and ultraviolet light.

3. The light emitting device according to claim 1, further comprising an infrared light emitter to be driven by a drive voltage with an on-off pattern corresponding to the light emitting time being supplied from the switching circuit, wherein the light emitter comprises a visible light emitter to emit visible light.

4. The light emitting device according to claim 1, wherein the switching circuit is adapted, upon the switching of the power supply voltage for generation of the drive voltage, to make a ratio of a total on-time to a total off-time of the signal pattern twice or more.

5. The light emitting device according to claim 1, wherein the switching circuit is adapted, upon the switching of the power supply voltage for generation of the drive voltage, to add a sync bit to the signal pattern.

* * * * *